UNITED STATES PATENT OFFICE.

ZDENKO HANNS SKRAUP, OF VIENNA, AUSTRIA-HUNGARY, ASSIGNOR TO BADISCHE ANILIN AND SODA FABRIK, OF MANNHEIM, GERMANY.

MANUFACTURE OF PARACHINANISOL.

SPECIFICATION forming part of Letters Patent No. 295,825, dated March 25, 1884.

Application filed December 14, 1883. (Specimens.)

*To all whom it may concern:*

Be it known that I, ZDENKO HANNS SKRAUP, a subject of the Emperor of Austria, residing at Vienna, in the Empire of Austria, have invented new and useful Improvements in Parachinanisol Produced from Para-Nitro-Anisol and Para-Amido-Anisol, of which the following is a specification.

This invention relates to the production of parachinanisol—a substance intended for the manufacture of medical compounds and for other purposes.

My invention is based on the discovery that the methylic ether of para-oxychinoline, and which I term "parachinanisol," may be obtained from the methylic ether of phenol (anisol) by heating mixtures of nitro and amido anisol with glycerine and sulphuric acid.

As an example of the manner in which my invention may be carried into effect, I proceed as follows: Ten parts, by weight, of para-amido-anisol are intimately mixed with eight parts, by weight, of para-nitro-anisol, and with fifty parts, by weight, of glycerine of about 1.25 specific gravity. I then add twenty-eight parts, by weight, of concentrated sulphuric acid of about 1.848 specific gravity, and the mixture is heated in a suitable still provided with a condensing arrangement, which allows the condensed vapors to run back again into the still. The temperature is maintained for some time at from 140° to 150° centigrade, and then gradually raised to about 155° centigrade, with due care to prevent the reaction from proceeding violently. After continuing the heating from two to three hours, little, if any, nitro-anisol will be found in the mixture, and the operation may be considered at an end. In order to separate the parachinanisol thus formed, the mixture is diluted with about its equal bulk of water, and submitted to a distillation with steam until any remaining traces of unchanged para-nitro-anisol have been driven off. Caustic soda is then added in slight excess, and the parachinanisol thus liberated is separated by distillation with steam. The distilled liquor, which contains parachinanisol in aqueous solution, is neutralized with hydrochloric acid and evaporated to dryness. The parachinanisol thus obtained in the state of its hydrochlorate may be further purified by dissolving the same in water and precipitating the solution with bichromate of potash in excess, whereby any remaining traces of oxidizable bases—such, for instance, as anisiline—are destroyed. The chromate of parachinanisol thus obtained may be recrystallized from water and decomposed by the addition of caustic soda in excess. The parachinanisol thus set free may then be obtained in a pure condition by distillation with steam.

In the above process paranitranisol may be replaced by its equivalent amount of nitro-benzole or other nitro compounds, because its action principally consists in oxidizing the hydrogen, which is generated by the action of glycerine and sulphuric acid upon para-amido-anisol. Parachinanisol thus produced is at an ordinary temperature an oily liquid soluble in water, and possessing a faint chinoline-like odor. It is heavier than water. The aqueous solutions of its saline compounds exhibit a blue fluorescence, similar to that of the salts of quinine. They are acted upon by chlorine-water and ammonia in a similar manner as salts of quinine under production of a green color or precipitate.

The hydrochlorate and sulphate of para-chinanisol are very easily soluble in water. The tartrate and binoxalate are difficultly soluble in water.

By mixing dilute solutions of parachinanisol and picric acid the picrate of parachinanisol is obtained in the state of a light yellow precipitate, almost insoluble in water.

A double compound of chloride of zinc with hydrochlorate of parachinanisol—such as may be produced by mixing solutions of the said compounds—crystallizes in the shape of fine needles, which dissolve with remarkable difficulty in water containing a large amount of hydrochloric acid.

What I claim as new, and desire to secure by Letters Patent, is—

As a new product, the parachinanisol hereinbefore described, and having the characteristics above set forth.

In testimony whereof I have hereunto set my hand in the presence of two subscribing witnesses.

ZDENKO HANNS SKRAUP.

Witnesses:
 G. NIEDERIST,
 OTTO FISCHER.